(12) United States Patent
Bi et al.

(10) Patent No.: US 9,958,474 B2
(45) Date of Patent: May 1, 2018

(54) SELF-CALIBRATING INDICATING DEVICE (71) Applicants: DENSO International America, Inc., Southfield, MI (US); DENSO CORPORATION, Kariya, Aichi-pref. (JP)

(72) Inventors: Ke Bi, Clawson, MI (US); Takaaki Muramatsu, Novi, MI (US); Jill DeGowske, Farmington Hills, MI (US)

(73) Assignees: DENSO International America, Inc., Southfield, MI (US); DENSO CORPORATION, Kariya (JP)

( * ) Notice: Subject to any disclaimer, the term of this patent is extended or adjusted under 35 U.S.C. 154(b) by 209 days.

(21) Appl. No.: 14/852,925

(22) Filed: Sep. 14, 2015

(65) Prior Publication Data
US 2017/0075437 A1 Mar. 16, 2017

(51) Int. Cl.
G06F 3/0362 (2013.01)
G01P 21/02 (2006.01)
G01P 1/08 (2006.01)

(52) U.S. Cl.
CPC ................ G01P 21/02 (2013.01); G01P 1/08 (2013.01)

(58) Field of Classification Search
CPC ....... G06F 3/0362; G06F 3/016; G06F 3/0338
See application file for complete search history.

(56) References Cited

U.S. PATENT DOCUMENTS

| 6,062,063 A * | 5/2000 | Robson | B60K 37/02 73/1.88 |
|---|---|---|---|
| 2006/0092001 A1* | 5/2006 | Yokota | B60K 35/00 340/425.5 |
| 2007/0139905 A1* | 6/2007 | Birman | B60K 37/02 362/23.07 |
| 2008/0048879 A1* | 2/2008 | Lipman | B60K 37/02 340/688 |
| 2015/0068442 A1* | 3/2015 | Davis | G01D 11/28 116/288 |
| 2016/0096432 A1* | 4/2016 | Kobayashi | B60K 37/02 340/461 |
| 2016/0152139 A1* | 6/2016 | Sockolosky | B60K 35/00 340/441 |

FOREIGN PATENT DOCUMENTS

JP 2001-356029 A 12/2001

* cited by examiner

Primary Examiner — Alexander Eisen
Assistant Examiner — Mansour M Said (57) ABSTRACT A pointer is rotational relative to the screen. A driver unit rotates the pointer. An imaging device detects an image of the pointer sends a signal of the image. A controller receives the signal of the image from the imaging device. The screen indicates a graphic. The controller modifies the graphic according to the signal of the image.

19 Claims, 13 Drawing Sheets

SELF-CALIBRATING INDICATING DEVICE

TECHNICAL FIELD

The present disclosure relates to a self-calibrating indicating device.

BACKGROUND

Conventionally, an indicating device such as a meter device may include a pointer movable to point a dial gauge to indicate information such as a speed of a vehicle. A pointer may be set to a stepping motor and may be calibrated relative to a dial gauge in a manufacturing process of a meter device in a factory. During operation of the meter device, the pointer may be misaligned relative to the dial gauge.

SUMMARY

According to an aspect of the preset disclosure, a pointer may be rotational relative to a screen. A driver unit may be equipped with the pointer and may be configured to rotate the pointer. An imaging device may be configured to detect an image of the pointer and to send a signal of the image. A controller may be configured to receive the signal of the image from the imaging device. The screen may be configured to indicate a graphic. The controller may be configured to modify the graphic according to the signal of the image.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION

First Embodiment

As follows, an indicating device (meter device) 1 will be described with reference to drawings. In drawing(s), "VERTICAL" may correspond to a vertical direction. "AXIAL" may correspond to an axial direction. "RADIAL" may correspond to a radial direction. "HORIZONTAL" may correspond to a horizontal direction. "CIRCUMFERENTIAL" may correspond to a circumferential direction.

Figure 1:
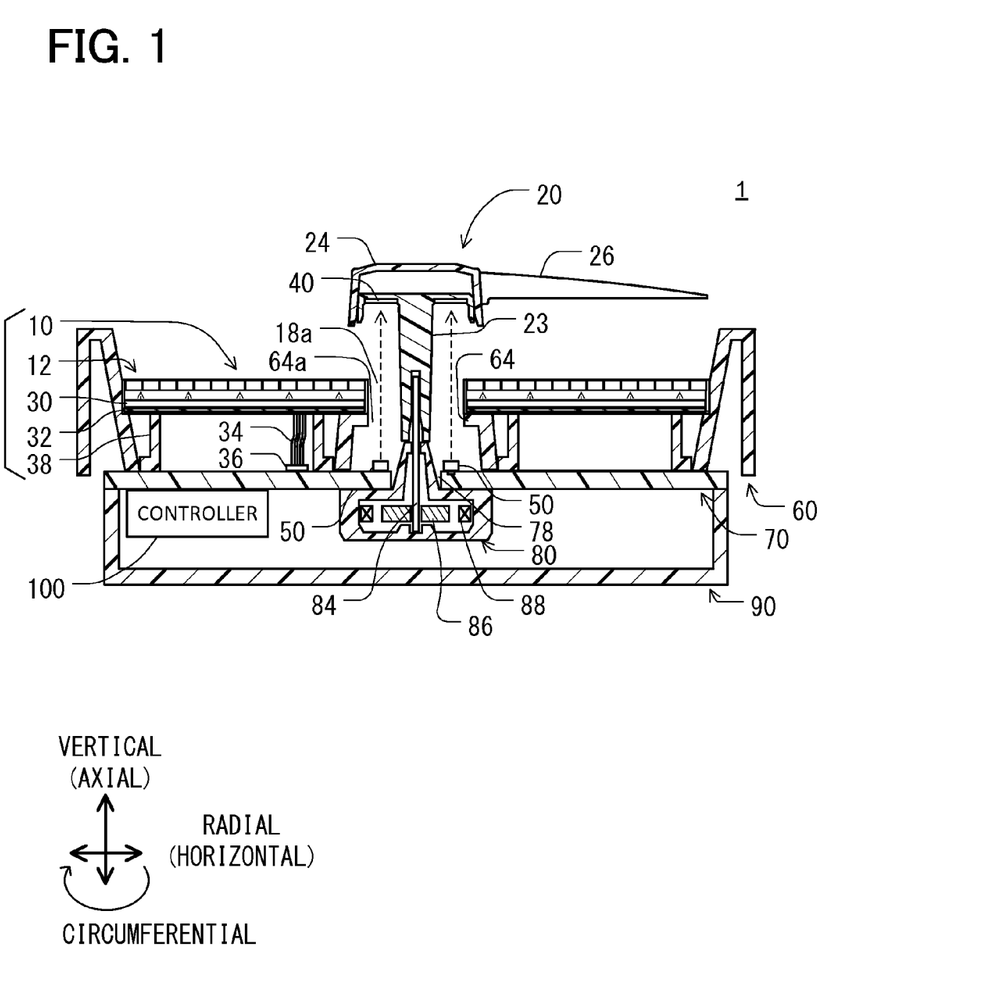
FIG. 1 is a sectional view showing an indicating device of a first embodiment.

In FIG. 1, the meter device 1 is, for example, a speedometer for an automobile. The meter device 1 may include a pointer 20, a screen 10, a lighting device 30, an imaging device 50, a main housing 60, a printed circuit board (PCB) 70, a driver unit 80, and a rear housing 90.

The screen 10 is, for example, an LCD display or an organic EL display having a full-color dot-matrix configuration having multiple pixels 12, which are selectively activated. More specifically, the screen 10 may be an active matrix display such as a TFT LCD display. The screen 10 may be fortified by a translucent substrate formed of a translucent material such as glass. The screen 10 may have a display surface facing a viewer such as an occupant of an automobile.

Figure 6:
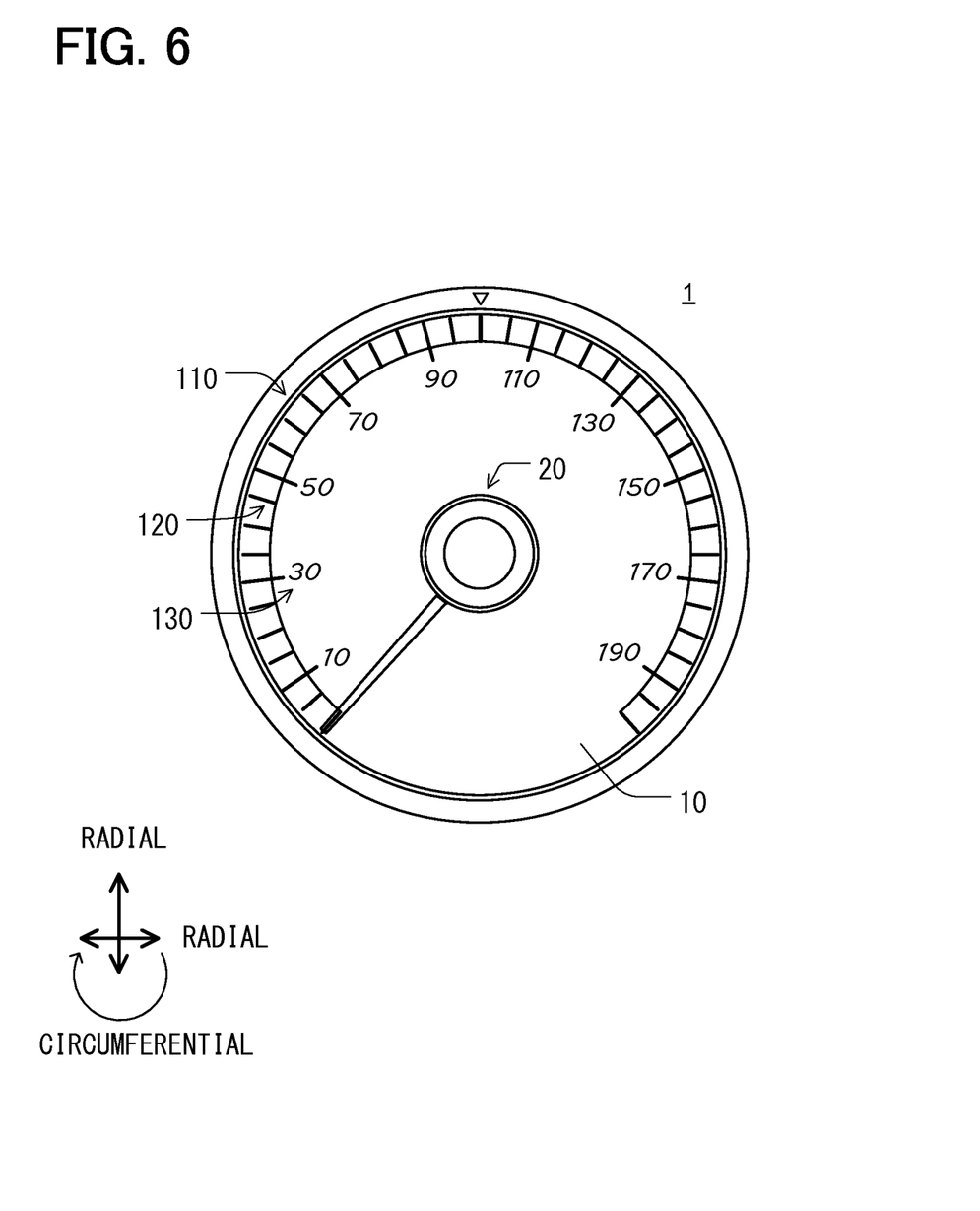
FIG. 6 is a front view showing the indicating device in a normal state.

As shown in FIG. 6, the screen 10 may be in a circular shape when viewed from the viewer. The screen 10 may be configured to indicate various graphics such as a dial gauge 110 including tick marks 120 and numeral symbols 130 to function as a gauge meter. The numeral symbols 130 may denote miles per hour (MPH). The screen 10 may modify the indication in various forms. For example, the screen 10 may switch between a mile scale (MPH) and a kilometer scale (km/h) by modifying numerals and scale pitch of the tick marks 120.

In FIG. 1, the screen 10 may have a center hole 18a at its center. The pointer 20 may be inserted in the center hole 18a. The pointer 20 may be located adjacent to the display surface of the screen 10. The pointer 20 may include a pointer shaft 23, a body 24, and an arm 26. The arm 26 may extend linearly from the body 24. The body 24 and the arm 26 may be located above the center hole 18a. The pointer shaft 23 may extend through the center hole 18a.

The lighting device 30 may be equipped on a sub-PCB 32 and may be located behind the screen 10 to form a backlight configuration. The lighting device 30, the sub-PCB 32, and the screen 10 may be integrated into a singular indicator module 4. The sub-PCB 32 may be equipped with a flat cable 34. The indicator module 4 may be mounted on the PCB 70 via a mounter 38. The flat cable 34 may be coupled with a wire harness 36 equipped on the PCB 70 to electrically communicate the indicator module 4 with the PCB 70. The sub-PCB 32 may have printed wirings to conduct electric power from the PCB 70 to drive the lighting device 30 and the screen 10. The printed wirings of the sub-PCB 32 may conduct an electronic signal from the PCB 70 to operate the lighting device 30 and the screen 10.

The lighting device 30 may emit light to the rear side of the screen 10. The lighting device 30 may be a combination of a non-opaque light conductor and a light source such as a light emitting diode (LED) and/or a fluorescent tube. The light source may emit light into the light conductor. The light conductor may diffuse the light and may cause reflection of the light internally thereby to direct the light toward the rear side of the screen 10.

The PCB 70 may be located between the main housing 60 and the rear housing 90. The PCB 70 may be equipped with the lighting device 30 such that the lighting device 30 is opposed to the rear side of the screen 10. The PCB 70 may have a center hole 78 at its center. The PCB 70 may be equipped with electronic wirings and electronic devices such as a controller 100. The controller 100 may be a microcomputer including a CPU, a storage unit such as a RAM and ROM, which are connected with an internal bus. The controller 100 may be configured to execute a computer program to implement various processings thereby to control components and to create data of a graphic.

The driver unit 80 may be equipped to the PCB 70. The driver unit 80 may be stationary relative to both the PCB 70 and the screen 10. The driver unit 80 may be an electric motor such as a stepping motor. The driver unit 80 may include a driver shaft 84, a rotor 86, and a stator 88, which are coaxial with each other. The driver shaft 84 may be supported at both ends and may be affixed to the rotor 86. The stator 88 may be configured to receive electricity from a driving circuit via electric wirings 72 (FIG. 4) printed on the PCB 70. Thus, the stator 88 may generate a magnetic field and to drive the driver shaft 84 via the rotor 86. Specifically, the stator 88 may include teeth being equipped with windings, respectively. The driving circuit may energize the windings sequentially to generate a rotational magnetic field. The rotational magnetic field may induce adjacent teeth formed on the rotor 86 thereby to rotate the rotor 86 and the driver shaft 84. The diver unit may include a reduction gear combined with the stepping motor. The driving circuit may be controlled by the controller 100.

Alternatively, the driver unit 80 may be an electric motor combined with a spring. In this case, the driver unit 80 may rotate at a position at which a resilience of the spring is balanced with a driving torque generated by the electric motor. The driver shaft 84 may be projected through the center hole 78 of the PCB 70.

The driver shaft 84 may be further coupled with the pointer shaft 23 of the pointer 20. The driver unit 80 may be configured to manipulate the pointer 20 at an appropriate position to point the tick marks 120 and the numeral symbols 130 indicated on the screen 10.

The main housing 60 may include a housing center 64 defining a tubular hollow 64a. In the example, the imaging device 50 may be equipped on the PCB 70 and may be located in the tubular hollow 64a of the housing center 64. The rear housing 90 may be equipped to the PCB 70 to accommodate the driver unit 80 and the controller 100.

Figure 2:
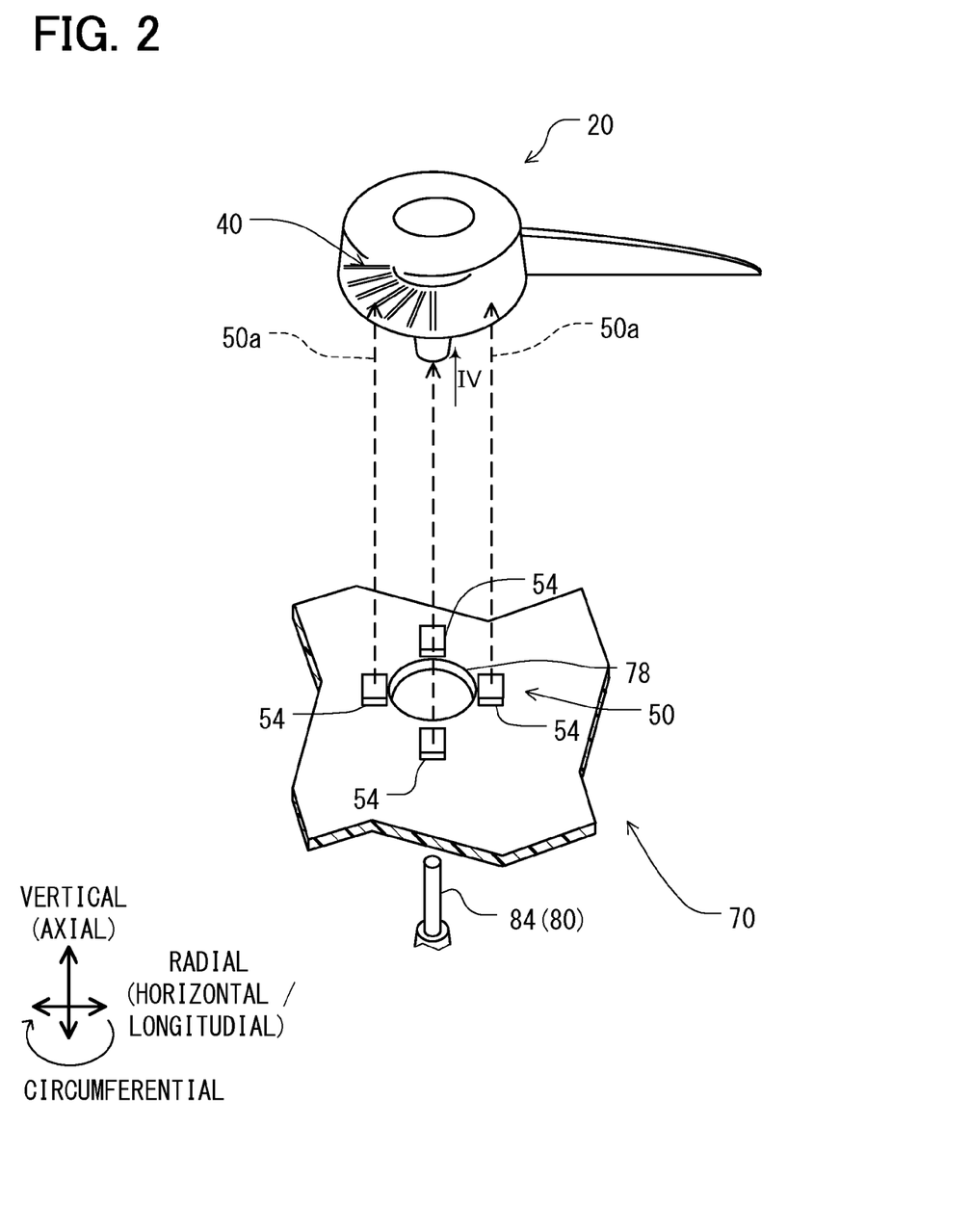
FIG. 2 is a perspective view showing components of the indicating device.

As shown in FIG. 2, according to the present example, the imaging device 50 may include four imaging elements 54. Each imaging element 54 may be a coupled charge device (CCD) sensor, which may be an array of CCD elements and may be configured to detect a shape and a color of an object.

The pointer shaft 23 of the pointer 20 and the driver shaft 84 of the driver unit 80 may be coupled together to extend through the center hole 78 of the PCB 70. The imaging elements 54 may be faced to a rear side of the pointer 20. The imaging elements 54 may be positioned on the PCB 70, such that optical axes 50a thereof are directed toward the rear side of the pointer 20.

Figure 3:
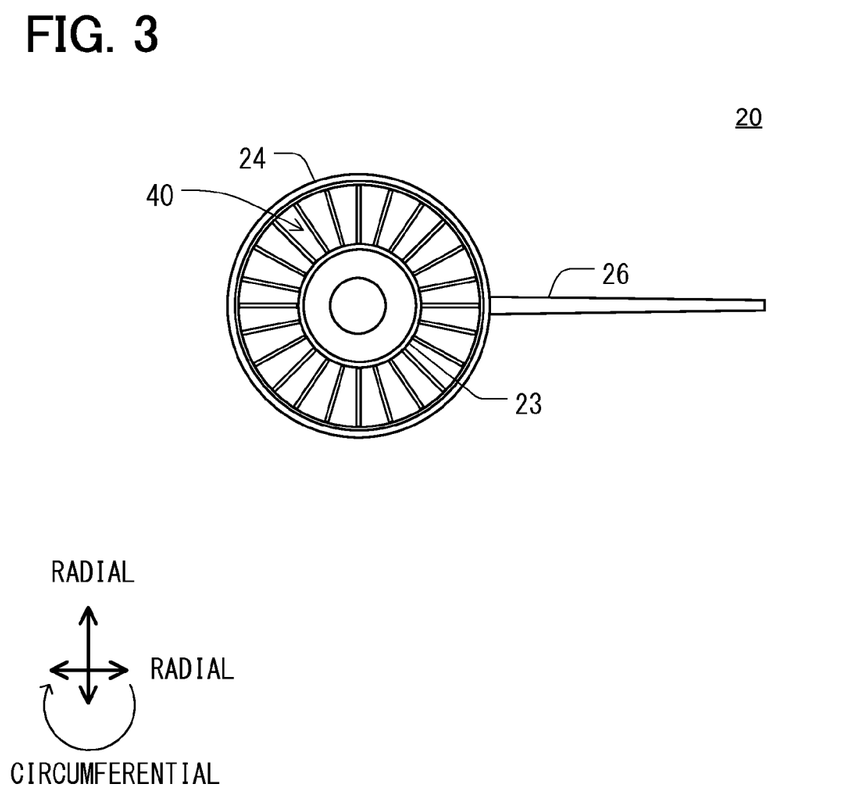
FIG. 3 is a rearview showing a pointer of the indicating device; sectional view showing a pointer of the indicating device.

As shown in FIG. 3, the pointer 20 may have slits (marker) 40 on the rear side of the body 24. The slits 40 may be extended from a radially center side to a radially outer side. Each of the slits 40 may be in a rectangular shape or in a sector shape. The slits 40 may be allocated at a regular interval in the circumferential direction. In actual configuration, the slits 40 may be allocated at a fine pitch.

In FIG. 2, in the present example, the imaging elements 54 may be opposed to the slits 40 of the pointer 20 and may be enabled to detect an image of the slits 40. As the driver unit 80 rotates the pointer 20, the imaging element 54 may send an image signal of the slits 40 to the controller 100 (FIG. 3). Thus, the controller 100 may count the number of the slits 40 passing over the imaging element 54. In this way, the controller 100 may detect the rotational position of the pointer 20.

Figure 4:
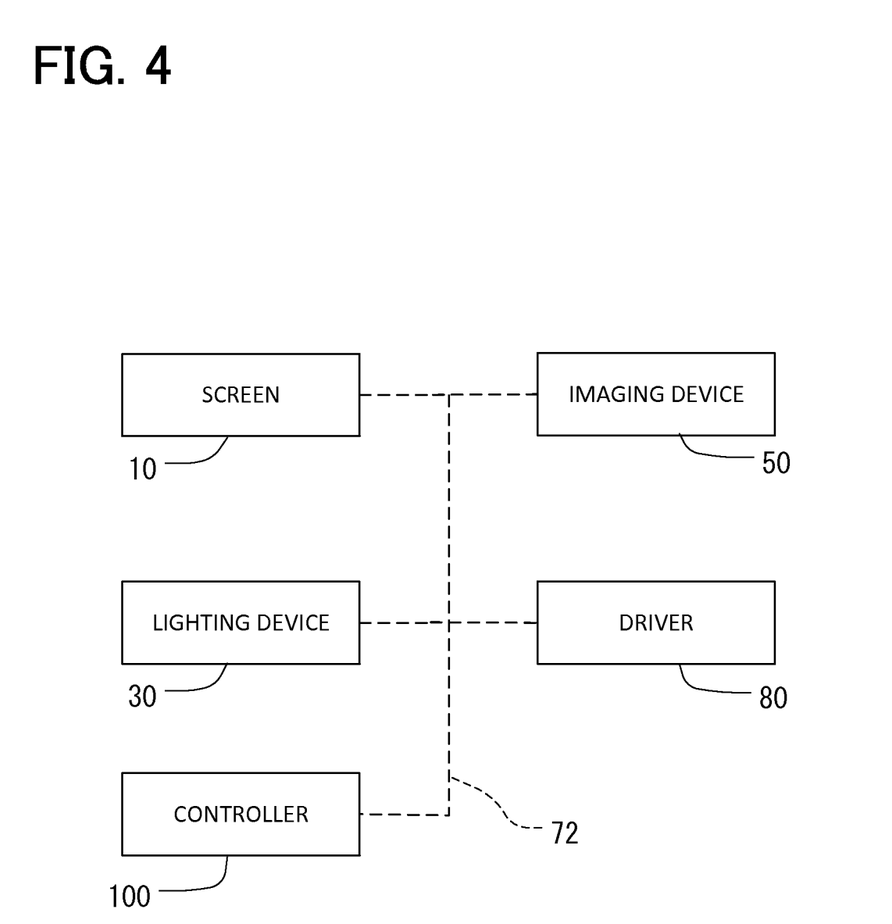
FIG. 4 is a block diagram showing electrical connection of the indicating device.

As shown in FIG. 4, in the example, the controller 100 may be electrically connected with the screen 10, the imaging device 50, the lighting device 30, and the driver unit 80 via for example, a signal bus. The signal bus may be formed of the electric wiring 72 printed on the PCB 70. The imaging device 50 may send the detection signal (image signal) to the controller 100 thereby to enable the controller 100 to recognize the rotational position of the pointer 20. The controller 100 may create a graphic image signal of the dial gauge 110 and may send the graphic image signal to the screen 10 to indicate the dial gauge 110 on the screen 10. The controller 100 may control energization of the lighting device 30 thereby to manipulate intensity of light emitted from the lighting device 30 to the screen 10.

As follows, a calibration process of the meter device 1 will be described. Before the meter device 1 is shipped from a manufacturing factory, the position of the pointer 20 may be calibrated relative to the dial gauge 110 to point tick marks 120 indicated on the screen 10 accurately. Specifically, this calibration in the factory may be implemented as follows. For example, in FIG. 6, the controller 100 may be operated to finely adjust a quantity of electricity supplied to the driver unit 80 in order to manipulate the pointer 20 at a position corresponding to a tick mark of 0 MPH in the dial gauge 110 accurately. Subsequently, the controller 100 may store the quantity of the electricity correlated with the position of the pointer 20 corresponding to 0 MPH. In this way, the controller 100 may recognize the quantity of electricity corresponding to 0 MPH. Thereafter, the controller 100 may instruct to supply the stored quantity of electricity to manipulate the pointer 20 at 0 MPH accurately. The present calibration may be implemented at multiple rotational positions in the rotational range of the pointer 20. For example, the rotational range may be divided into several rotational sections, and the calibration may be implemented for each of the rotational sections.

Thereafter, during operation of the meter device 1, the pointer 20 may be misaligned from its original calibrated position (original position). The misalignment may occur due to, for example, the driver unit 80 loses synchronism between the rotor 86 and stator 88 to cause a step out. In addition, the misalignment may occur due to mechanical slipping between the driver shaft 84 and the pointer shaft 23 and/or between the driver shaft 84 and the rotor 86. The misalignment may occur due to, for example, displacement of the pointer 20, the PCB 70, and/or the like from its original position due to physical impact or the like. During operation of the meter device 1, a rotational range of the meter device 1 may be reduced or enlarged relative to an original rotational range in a case where a characteristic of an electric motor is varied due to aging or deterioration. The original rotational range may be a rotational range of the meter device 1 after calibration at a factory. The present example may be configured to implement the calibration process to align the relative relation between the pointer 20 and the dial gauge 110.

Figure 5:
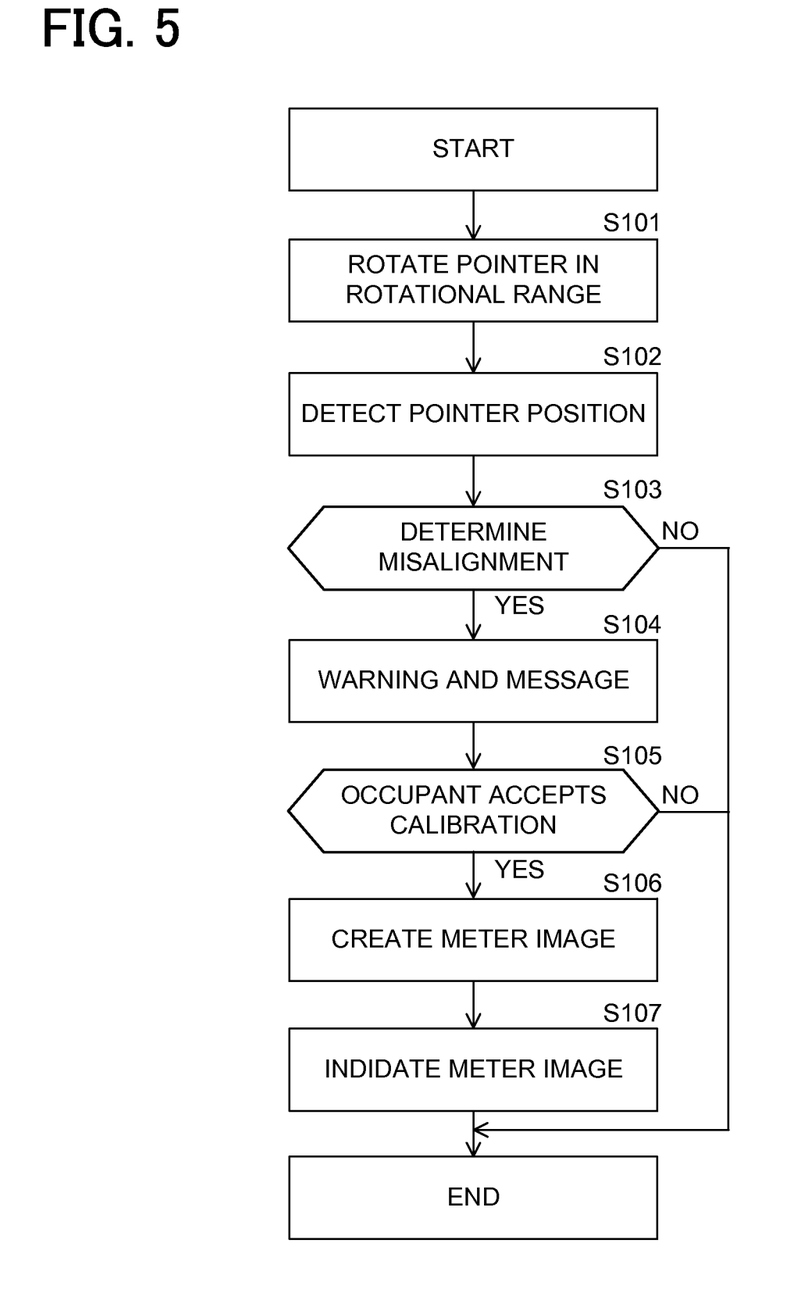
FIG. 5 is a flowchart showing a calibration process of the indicating device.

The controller 100 may execute a program to implement a calibration process shown in FIG. 5 on demand from the occupant and/or when the vehicle is started or terminated. The controller 100 may execute the program at a predetermined interval such as one second.

At S101, the controller 100 may cause the driver unit 80 to rotate the pointer 20 throughout a rotational range of the pointer 20 from the minimum rotational position to the maximum rotational position. At S102, the controller 100 may detect the position of the pointer 20 according to the image signal from the imaging device 50. Specifically, the controller 100 may detect a minimum rotational position of the pointer 20 when the driver unit 80 receives a minimum electric signal to actuate the pointer 20 at the minimum rotational position. In addition, the controller 100 may detect a maximum rotational position of the pointer 20 when the driver unit 80 receives a maximum electric signal to actuate the pointer 20 at the maximum rotational position.

At S103, the controller 100 may determine whether the pointer 20 is misaligned. Specifically, the controller 100 may compare the detected minimum rotational position with a predetermined minimum rotational position and may compare the detected maximum rotational position with a predetermined maximum rotational position to calculate an error therebetween. The controller 100 may determine that the pointer 20 is misaligned when, for example, the error is one percent or more of the rotational range. The controller 100 may determine that the pointer 20 is misaligned when, for example, the error is one millimeter or more from the corresponding predetermined minimum rotational position or predetermined maximum rotational position.

The determination may not be limited to the misalignment. It is noted that, at S103, the controller 100 may determine a variation in the rotational range of the meter device 1. Specifically, the controller 100 may determine whether the rotational range of the pointer 20 is reduced from or enlarged beyond the original rotational range.

When the controller 100 determines that the misalignment or the variation occurs in the pointer 20, at S104, the controller 100 may show a warning 140 (FIG. 6) to warn an occupant of the misalignment (variation). In addition, the controller 100 may show a message 150 (FIG. 6) to prompt the occupant to implement the calibration process. At S105, the controller 100 determines whether an occupant accepts the prompt. The controller 100 determines that an occupant accepts the prompt when the occupant, for example, presses a predetermined switch and/or utters a voice command. At S106, the controller 100 may create a dial gauge graphic image in accordance with the error of the pointer 20. Specifically, the controller 100 may create the dial gauge graphic image by rotating the original dial gauge graphic image by a calibration angle correspondingly to the error. The controller 100 may create the dial gauge graphic image by moving the original dial gauge graphic image by a calibration distance correspondingly to the error. Alternatively or in addition, the controller 100 may determine that the rotational range of the pointer 20 is reduced from or enlarged beyond the original rotational range. In this case, the controller 100 may create the dial gauge graphic image by shrinking or by expanding the original dial gauge graphic image in the circumferential direction thereby to adjust the dial gauge graphic image to the actual rotational range. Those rotation, movement, shrinkage, and expansion may be combined arbitrarily according to the determination result. At S107, the controller 100 may cause the screen 10 to indicate the created dial gauge graphic image.

FIG. 6 shows the meter device 1 in a normal state, which is an original state after calibration in a factory. In the normal state, the driver unit 80 may receive a minimum electric signal to drive the pointer 20 to actuate the pointer 20 at the minimum rotational position. The minimum rotational position may correspond to 0 MPH when the vehicle stops at 0 MPH. The pointer 20 may point a minimum tick mark specifying 0 MPH accurately.

Figure 7:
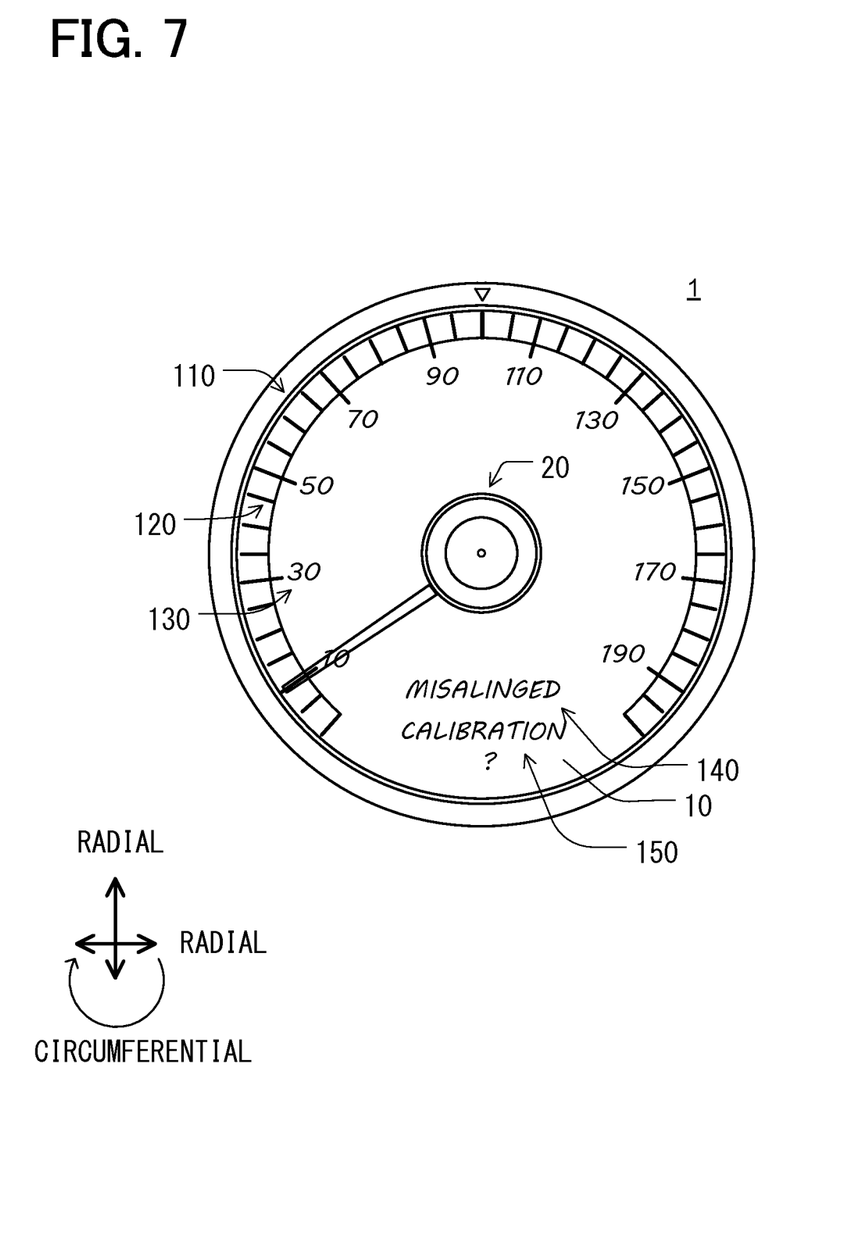
FIG. 7 is a front view showing the indicating device in a misaligned state.

FIG. 7 shows the meter device 1 in a misaligned state, in which the pointer 20 causes misalignment relative to the position in the normal state. In the example, the pointer 20 may point a tick mark specifying 10 MPH when the driver unit 80 drives the pointer 20 to actuate the pointer 20 at the minimum rotational position. The controller 100 may detect misalignment and may cause the screen 10 to indicate the warning 140 and the message 150.

Figure 8:
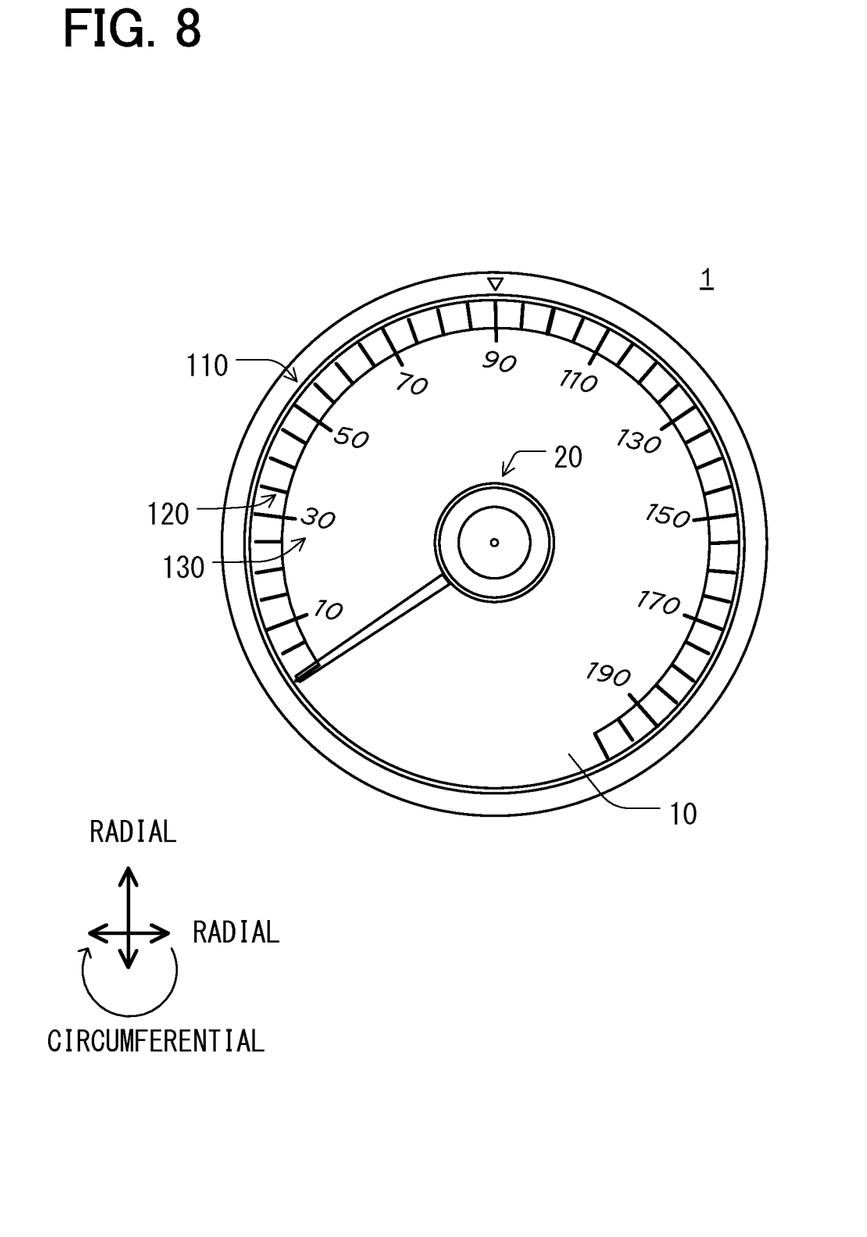
FIG. 8 is a front view showing the indicating device in a re-calibrated state.

FIG. 8 shows the meter device 1 in a re-calibrated state after completion of the calibration process. Specifically, the screen 10 indicates the dial gauge 110, which is rotated clockwise such that the pointer 20 is on the minimum tick mark representing 0 MPH when the driver unit 80 drives the pointer 20 to actuate the pointer 20 at the minimum rotational position.

Similarly, the calibration process may be implemented such that the pointer 20 is on a maximum tick mark representing 200 MPH when the driver unit 80 drives the pointer 20 to actuate the pointer 20 at the maximum rotational position.

In this way, the present configuration may enable the calibration process by modifying the indication of the dial gauge 110 on the screen 10 by implementing at least one of rotation, movement, shrinkage, and expansion of the dial gauge graphic image, without mechanical calibration of the driver unit 80.

During the calibration process, the controller 100 may create animation image to modify continuously and gradually the dial gauge 110 when implementing at least one of rotation, movement, shrinking, and expanding of the dial gauge graphic image. That is, the controller 100 may cause the screen 10 to rotate, move, shrink, and/or expand the dial gauge graphic image continuously and gradually to notify a viewer of implementation of the calibration process visually.

Second Embodiment

Figure 9:
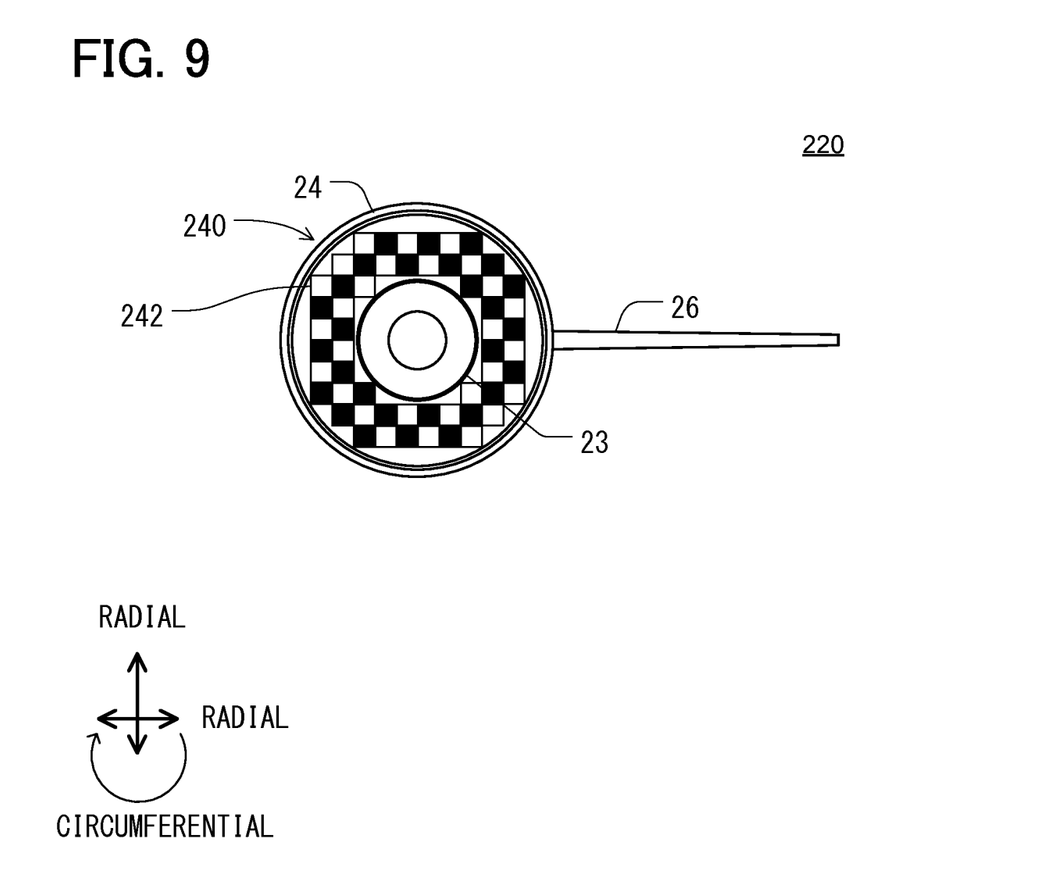
FIG. 9 is a rearview showing a pointer of a second embodiment.

As shown in FIG. 9, in the example, a pointer 220 may have a marker 240 in the body 24. The marker 240 may include, for example, tiles 242 in different colors to form a matrix array. In actual configuration, the marker 240 may include larger number of tiles 242 to form a finer structure. The imaging device 50 and the controller 100 may be enabled to detect lateral and/or vertical displacement of the pointer 20 by counting movement of the tiles 242. The marker 240 may employ various configurations to enable the detection device to detect the position of the pointer 20.

Figure 10:
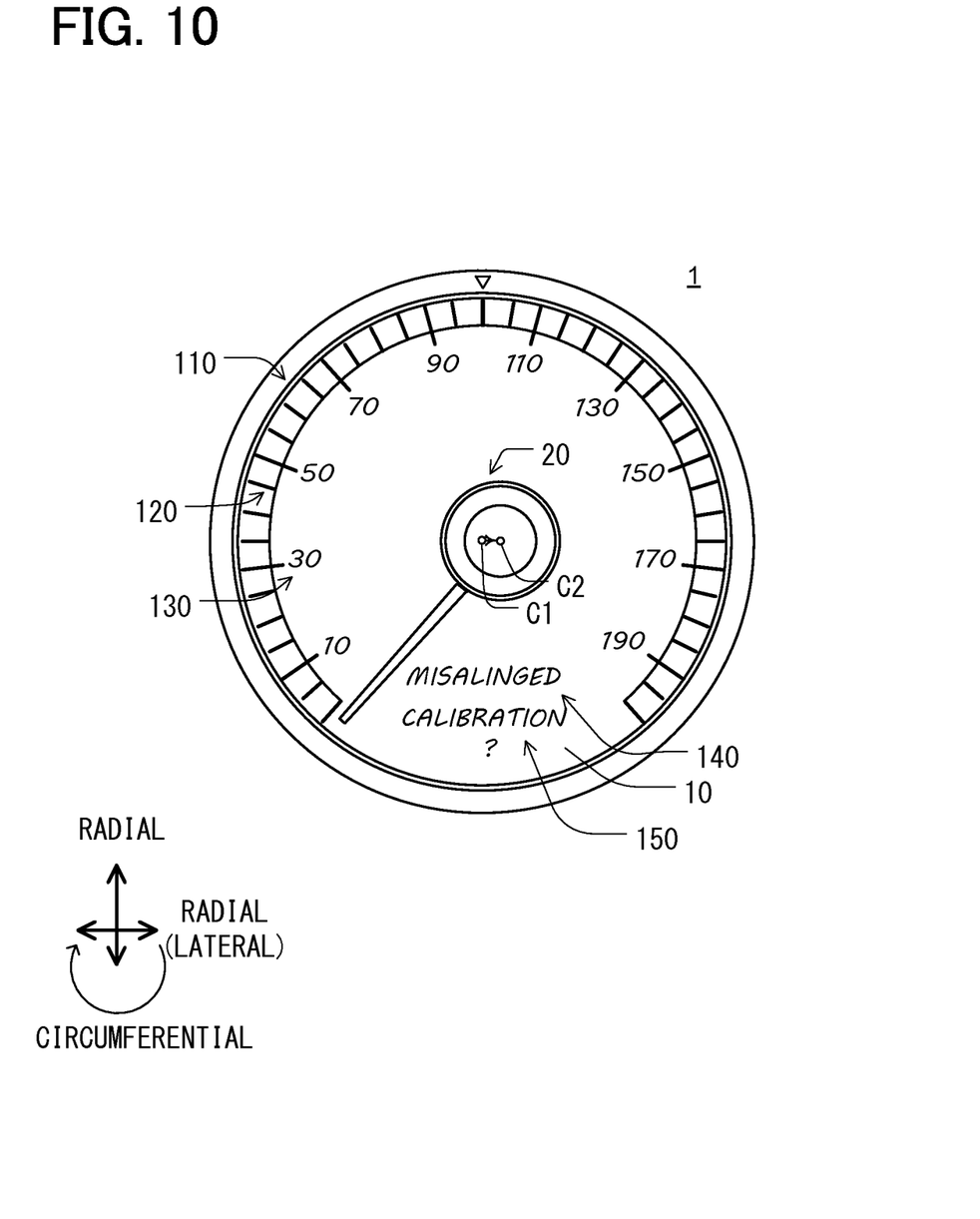
FIG. 10 is a front view showing the indicating device in a misaligned state.

FIG. 10 shows the meter device 1 in which the pointer 20 causes misalignment in the lateral direction relative to the originally calibrated position. Specifically, as shown by the arrow, an original center C1 may be displaced to a displaced center C2 in the drawing. In the example, the pointer 20 may be out of the tick marks 120 rightward in the drawing. The controller 100 may detect the misalignment and may cause the screen 10 to indicate the warning 140 and the message 150.

Figure 11:
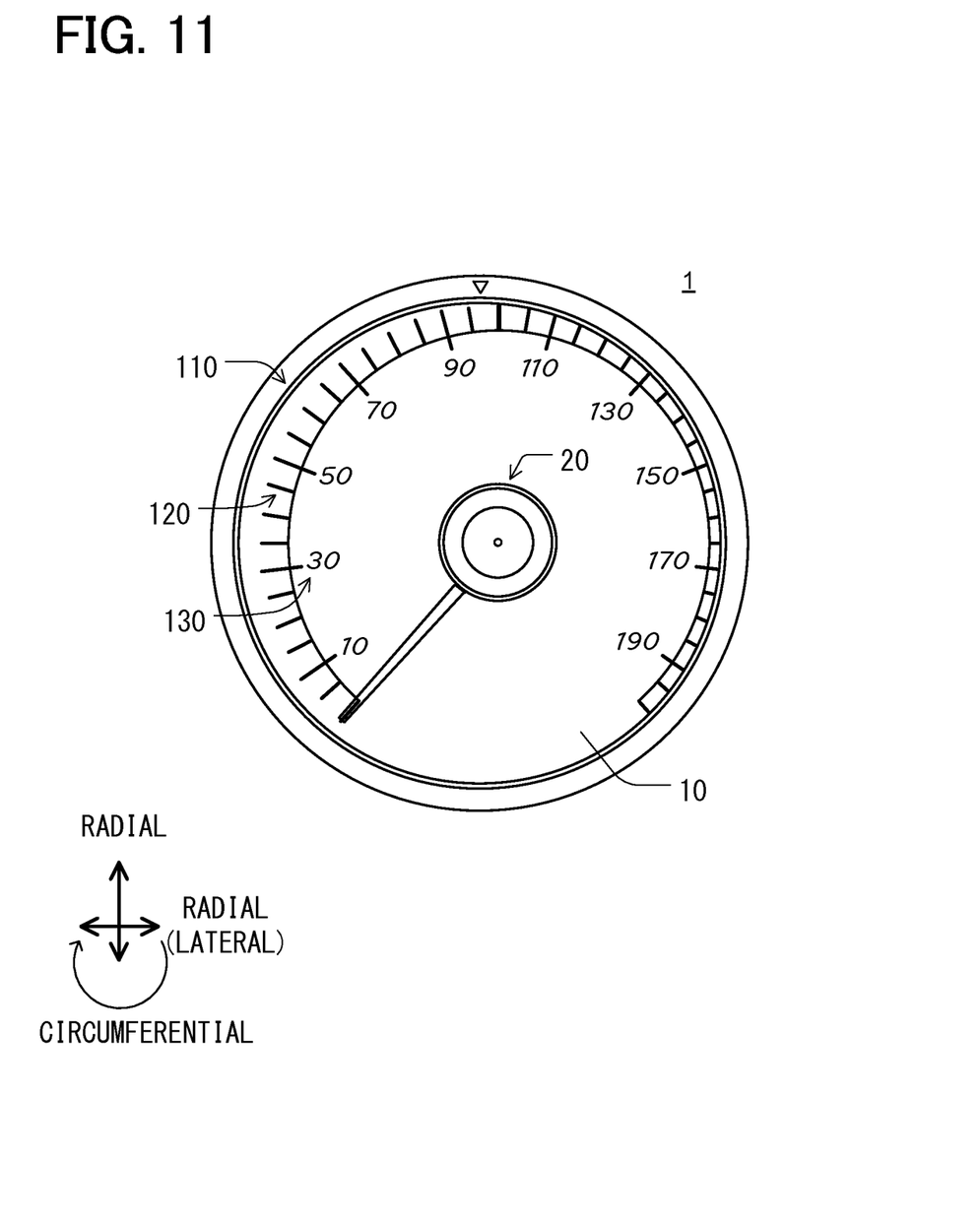
FIG. 11 is a front view showing the indicating device in a re-calibrated state.

FIG. 11 shows the meter device 1 after completing the calibration process. Specifically, the screen 10 indicates the dial gauge 110, which is moved rightward in the lateral direction such that the pointer 20 is on the minimum tick mark representing 0 MPH when the driver unit 80 drives the pointer 20 to actuate the pointer 20 at the minimum rotational position.

Third Embodiment

Figure 12:
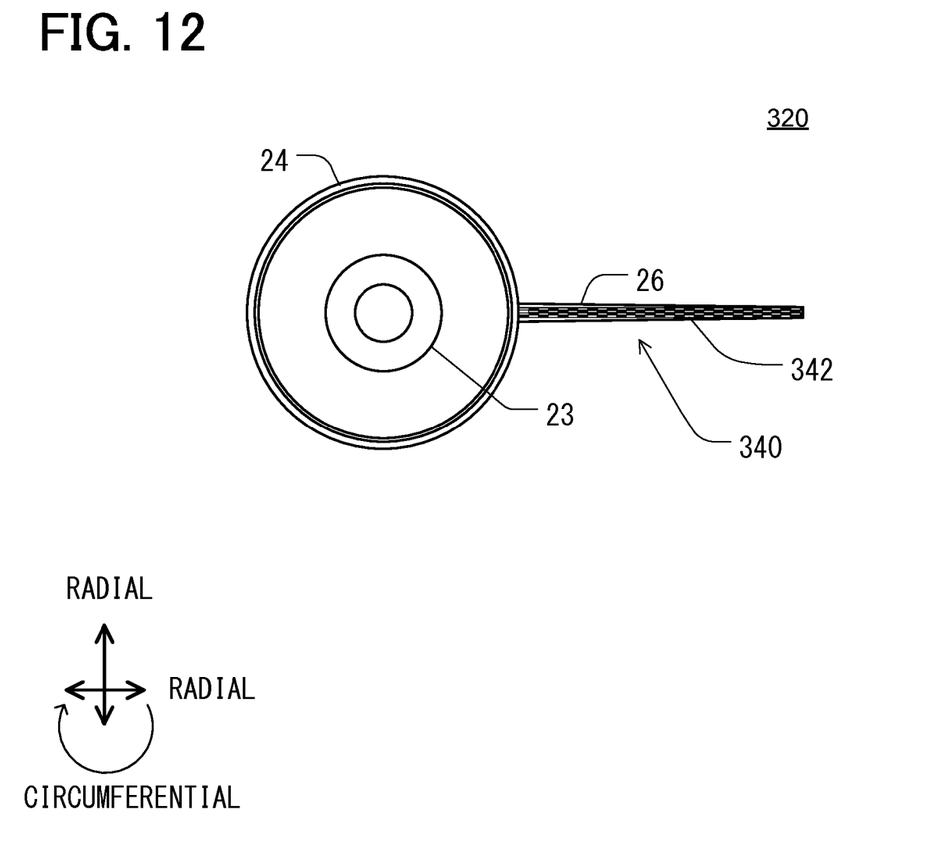
FIG. 12 is a rearview showing a pointer of a third embodiment.

As shown in FIG. 12, in the example, a pointer 320 may have a marker 340 in the arm 26. The marker 340 may include tiles 342 in different colors. In actual configuration, the marker 340 may include larger number of tiles 342 to form a finer structure.

Figure 13:
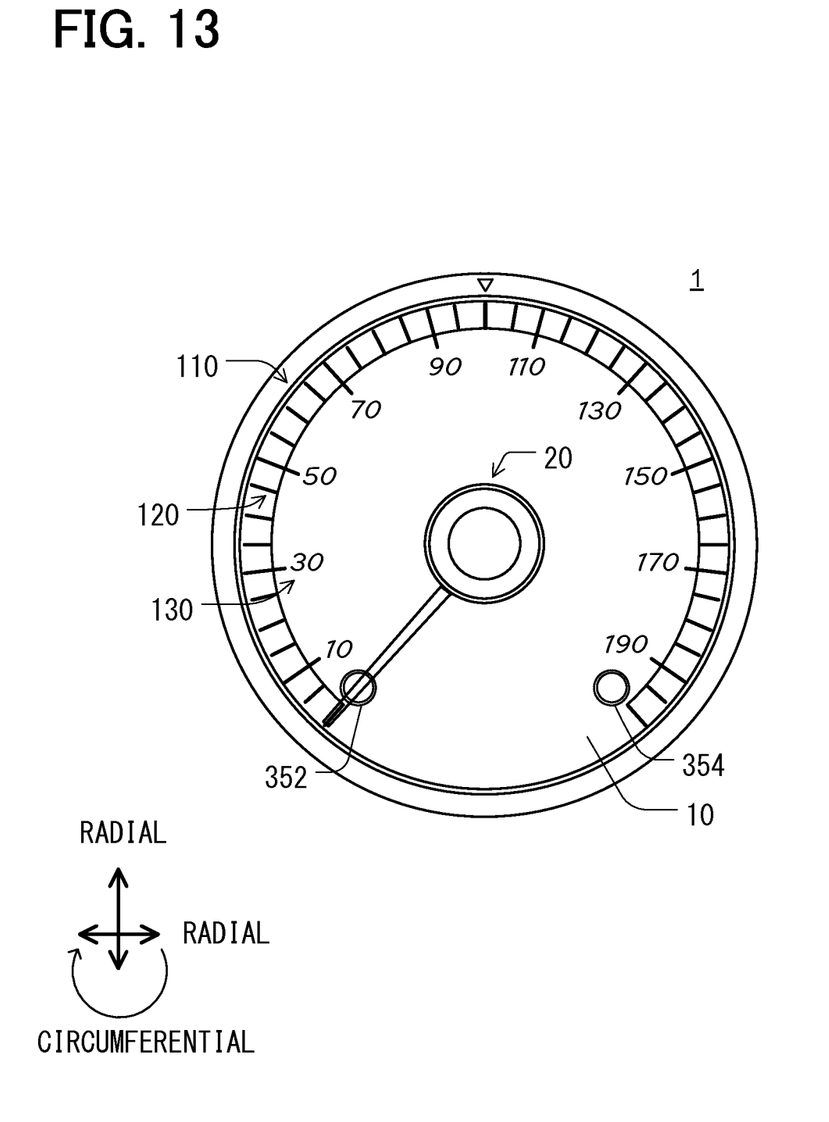
FIG. 13 is a front view showing an indicating device of the third embodiment.

As shown in FIG. 13, the meter device 1 may include imaging devices 352 and 354 at the minimum tick mark corresponding to 0 MPH and at a maximum tick mark corresponding to 200 MPH. The imaging devices 352, 354 and the controller 100 may be enabled to detect lateral and/or vertical displacement of the pointer 320 by counting movement of the tiles 342. The imaging devices 352 may be enabled to detect the minimum rotational position of the pointer 20, and the imaging device 354 may be enabled to detect the maximum rotational position of the pointer 20. When the pointer 20 is at any position, at least one of the imaging devices 352 and 354 may be away from the pointer 20. Therefore, at least one of the imaging devices 352 and 354 may be regularly used to detect an image of the interior of the cabin such as the driver in addition to calibrating the pointer 20.

Other Embodiments

The meter device 1 may be used in various control panels or instrument panels other than a speedometer.

In the calibration process, the controller 100 may detect the position of the pointer 20 when the driver unit 80 receives intermediate electric signals to actuate the pointer 20 at intermediate positions between the minimum rotational position and the maximum rotational position. The intermediate positions may be include a center position in the rotational range and may include positions, which are determined by evenly dividing the rotational range by an integer number such as 3, 4, or 5.

Similarly to the above embodiments, the calibration process may be implemented such that the pointer 20 is on an intermediate tick mark between the minimum tick mark and the maximum tick mark when the driver unit 80 drives the pointer 20 to actuate the pointer 20 at the minimum rotational position corresponding to the intermediate tick mark.

In the first embodiment, imaging element 54 may be one, two, or three or may be five or more. In the third embodiment, one imaging device may be omitted.

The lighting device 30 may be located at an edge of the screen 10 to form an edge-light configuration. The screen 10 may be an organic EL display having a self-luminous configuration without an additional lighting device 30.

The embodiments may be combined with each other and/or replaced with each other. The marker in the second embodiment may be applied to the first embodiment. The multiple imaging elements may be applied to the third embodiment.

It should be appreciated that while the processes of the embodiments of the present disclosure have been described herein as including a specific sequence of steps, further alternative embodiments including various other sequences of these steps and/or additional steps not disclosed herein may be intended to be within the steps of the present disclosure.

While the present disclosure may have been described with reference to preferred embodiments thereof, it may be to be understood that the disclosure may be not limited to the preferred embodiments and constructions. The present disclosure may be intended to cover various modification and equivalent arrangements. In addition, while the various combinations and configurations, which may be preferred, other combinations and configurations, including more, less or only a single element, may be also within the spirit and scope of the present disclosure.

What is claimed is:

1. An indicating device comprising:
a screen:
a pointer rotational relative to the screen;
a driver unit equipped with the pointer and configured to rotate the pointer;
an imaging device configured to detect an image of the pointer and to send a signal of the image; and
a controller configured to receive the signal of the image from the imaging device, wherein
the screen is configured to indicate a graphic, and
the controller is configured to modify the graphic according to the signal of the image.

2. The indicating device according to claim 1, wherein the graphic includes a dial gauge including at least one of a plurality of tick marks and a plurality of numeral symbols.

3. The indicating device according to claim 2, wherein the controller is configured to determine whether the pointer is misaligned from an original position, and the controller is configured to rotate or move the dial gauge when determining that the pointer is misaligned from the original position.

4. The indicating device according to claim 2, wherein the controller is configured to determine whether a rotational range of the pointer is reduced or enlarged relative to an original rotational range, and the controller is configured to expand or shrink the dial gauge when determining that the rotational range of the pointer is reduced or enlarged relative to the original rotational range.

5. The indicating device according to claim 1, wherein the controller is configured to modify the graphic such that a minimum tick mark in the dial gauge coincides with a minimum rotational position of the pointer when the driver unit drives the pointer to actuate the pointer at the minimum rotational position.

6. The indicating device according to claim 5, wherein the controller is configured to modify the graphic such that a maximum tick mark in the dial gauge coincides with a maximum rotational position of the pointer when the driver unit drives the pointer to actuate the pointer at the maximum rotational position.

7. The indicating device according to claim 6, wherein the controller is configured to modify the graphic such that an intermediate tick mark in the dial gauge coincides with an intermediate rotational position of the pointer when the driver unit drives the pointer to actuate the pointer at the intermediate rotational position.

8. The indicating device according to claim 1, wherein the pointer has a marker,
the imaging device is configured to detect an image of the marker and to send a signal of the image when being opposed to the marker, and
the controller is configured to detect a rotational position of the pointer according to the signal from the imaging device.

9. The indicating device according to claim 8, wherein the marker is a plurality of slits or a matrix array.

10. The indicating device according to claim 1, wherein the pointer includes an arm, a body, and a pointer shaft, and
the pointer shaft is extended through a through hole of the screen and is coupled with the driver unit.

11. The indicating device according to claim 10, wherein the imaging device is opposed to the body of the pointer through the through hole of the screen.

12. The indicating device according to claim 10, wherein the arm of the pointer has a marker, and
the imaging device is configured to be opposed to the arm.

13. The indicating device according to claim 10, wherein the body of the pointer has a marker, and
the imaging device is opposed to the body.

14. The indicating device according to claim 1, further comprising:
a circuit board electrically coupled with the controller, the driver unit, and the imaging device, and
the imaging device is equipped to the circuit board.

15. The indicating device according to claim 14, further comprising:
a lighting device circuit configured to emit light toward the screen, and
the lighting device is opposed to the screen.

16. The indicating device according to claim 1, wherein the screen is a dot matrix display.

17. The indicating device according to claim 1, wherein the driver unit is a stepping motor.

18. The indicating device according to claim 1, wherein the controller is configured to detect a minimum rotational position of the pointer to obtain a detected minimum rotational position when the driver unit drives the pointer to actuate the pointer at the minimum rotational position,
the controller is configured to compare the detected minimum rotational position with a predetermined minimum rotational position to calculate an error between the detected minimum rotational position and the predetermined minimum rotational position, and
the controller is configured to determine that the pointer is misaligned when the error is a threshold or more.

19. An indicating device comprising:
a screen:
a pointer rotational relative to the screen;
a driver unit equipped with the pointer and configured to rotate the pointer;
an imaging device configured to detect an image of the pointer and to send a signal of the image; and
a controller configured to receive the signal from the imaging device and to detect a rotational position of the pointer, wherein
the screen is configured to indicate a dial gauge including a plurality of tick marks and a plurality of numeral symbols, and
the controller is further configured to modify the dial gauge according to the rotational position of the pointer by implementing at least one of rotation, movement, shrinkage, and expansion of the dial gauge.

\* \* \* \* \*